United States Patent

Reibl et al.

[11] Patent Number: 5,640,609
[45] Date of Patent: Jun. 17, 1997

[54] PHOTOGRAPHIC CAMERA WITH A WATERTIGHT BODY

[75] Inventors: Michael Reibl, Boeblingen; Andreas Schweizer, Bad Ditzenbach, both of Germany

[73] Assignee: Eastman Kodak Company, Rochester, N.Y.

[21] Appl. No.: 570,257

[22] Filed: Dec. 11, 1995

[30] Foreign Application Priority Data

Dec. 15, 1994 [DE] Germany .................... 44 44 679.9

[51] Int. Cl.$^6$ ............................................ G03B 17/08
[52] U.S. Cl. .................................. 396/25; 396/29
[58] Field of Search ............... 354/64, 288; 396/25, 396/27, 29

[56] References Cited

U.S. PATENT DOCUMENTS

| | | | |
|---|---|---|---|
| 4,803,504 | 2/1989 | Maeno et al. | 354/64 |
| 5,177,515 | 1/1993 | Tsukamoto | 354/64 |
| 5,298,928 | 3/1994 | Suzuki et al. | 354/64 |
| 5,305,032 | 4/1994 | Arai | 354/64 |
| 5,325,139 | 6/1994 | Matsumoto | 354/64 |
| 5,512,969 | 4/1996 | Harris | 354/64 |

FOREIGN PATENT DOCUMENTS

| | | | |
|---|---|---|---|
| 1 135 281 | 8/1962 | Germany . | |
| 42 12 845 A1 | 10/1992 | Germany | G03B 13/10 |

*Primary Examiner*—Safet Metjahic
*Assistant Examiner*—Daniel Chapik
*Attorney, Agent, or Firm*—Roger A. Fields

[57] ABSTRACT

The invention relates to a photographic camera with a watertight body for receiving a film transport and film guidance unit, an object lens (13) and a viewfinder unit. Weatheproofing and watertightness are achieved in that the body comprises two body shells whose parting line formed in the assembled state is sealed by an all-round sealing means designed as an elastic endless weatherstrip visible from the outside.

4 Claims, 4 Drawing Sheets

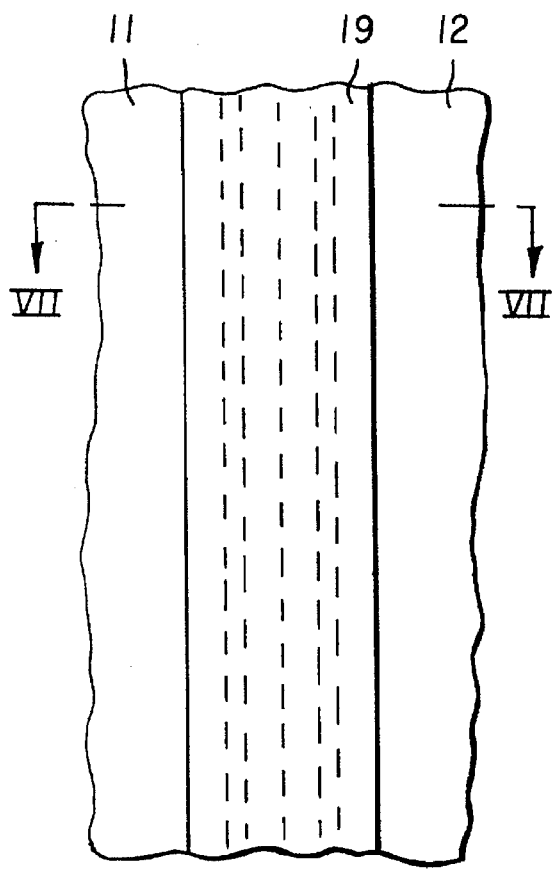
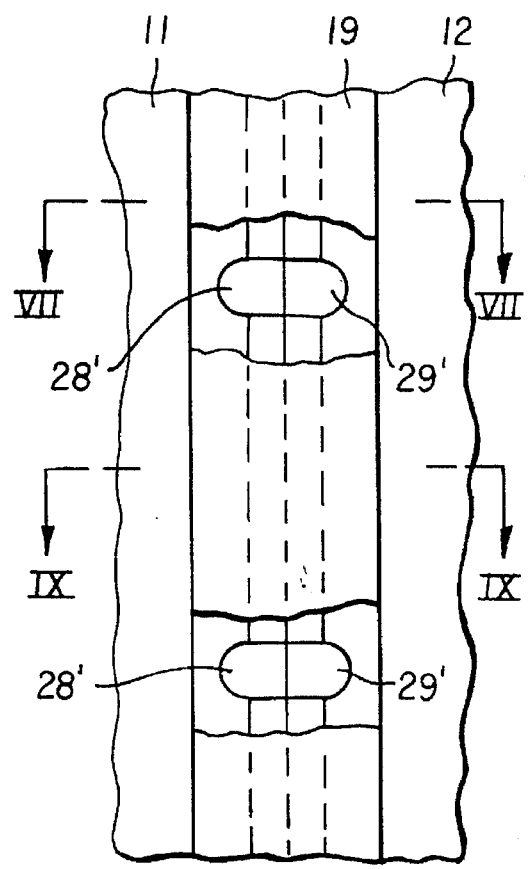
FIG. 6            FIG. 8
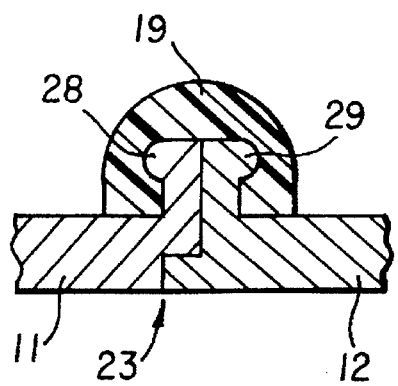
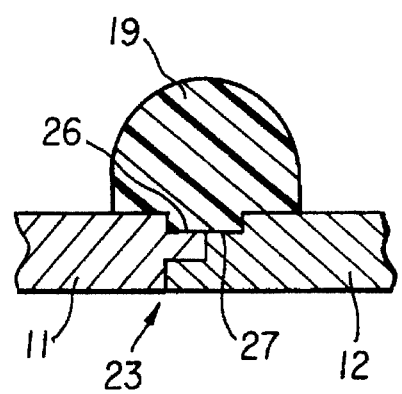
FIG. 7            FIG. 9

PHOTOGRAPHIC CAMERA WITH A WATERTIGHT BODY

FIELD OF THE INVENTION

The invention relates to photographic camera with a watertight body for receiving a film transport and film guidance unit, an object lens and a viewfinder device.

BACKGROUND OF THE INVENTION

Photographic cameras with watertight bodies are known; German Offenlegungsschrift 42 12 845 discloses a watertight camera whose camera body has a rear cover that in the closed state defines a watertight area by means of a rubber seal arranged concealed between the camera back and the camera body.

Furthermore, German Patent 11 35 281 describes a photographic body shell with a watertight body in which sealed openings are provided for the actuating elements of the camera. The body comprises two main parts, a shaft-like part and a covering part to fit tightly into the shaft opening. An elastic ring seal in the form of an O-ring is fitted into a circumferential groove of a part of the cover insert projecting into the shaft.

The camera forming the basis for the invention is a so-called disposable camera, which is loaded with photographic film by the manufacturer and returned by the camera user after exposure of the film to a finisher for development of the film, and by the finisher back to the manufacturer for loading with a new film. A camera of this type should have a camera body of the simplest possible design, for example without a folding back, but nevertheless be convenient to load and unload with photographic film and also ensure reliable water-tightness.

SUMMARY OF THE INVENTION

This object is attained in accordance with the invention in a camera of the type mentioned at the outset in that the body comprises two body shells whose parting line is sealed by an all-round sealing means when the body shells are in the assembled state.

The two body shells can have substantially identical dimensions here.

In an advantageous design, the sealing means is designed as an elastic endless weatherstrip passing round the outer face of the body shells, the latter having contact faces to receive the endless weatherstrip. In this case, one body shell is the camera front and the other body shell is the camera back.

In a further advantageous design, the body shells can have raised or recessed sections to receive the endless weatherstrip.

An advantageous embodiment of the subject of the invention also comprises engaging or locking means for connecting the body shells in the area of the endless weatherstrip. These means are arranged such that they are concealed by the endless weatherstrip, i.e. are not visible from the outside.

A camera designed in this way, the body of which comprises two body shells, ensures easy assembly of the film transport and film guidance unit, attachment of the object lens and of the flash unit, and loading of the camera with a film in the factory. After joining of the two body shells and attachment of the endless weatherstrip a simple yet dependably watertight camera is available.

BRIEF DESCRIPTION OF THE DRAWINGS

Further features and advantages of the camera are given in the description of the embodiments of the invention shown in the drawing, and in the further sub-claims. In the drawing, FIG. 6 shows a further embodiment of the camera in accordance with the invention in a plan view, FIG. 7 shows the camera according to FIG. 6 in a section along the line VII—VII in FIG. 6, and along line VII—VII in FIG. 8, FIG. 8 shows a further embodiment of the camera in accordance with the invention in a plan view, FIG. 9 shows the camera according to FIG. 8 in a section along the line IX—IX in FIG. 8.

DETAILED DESCRIPTION OF THE INVENTION

Figure 1:
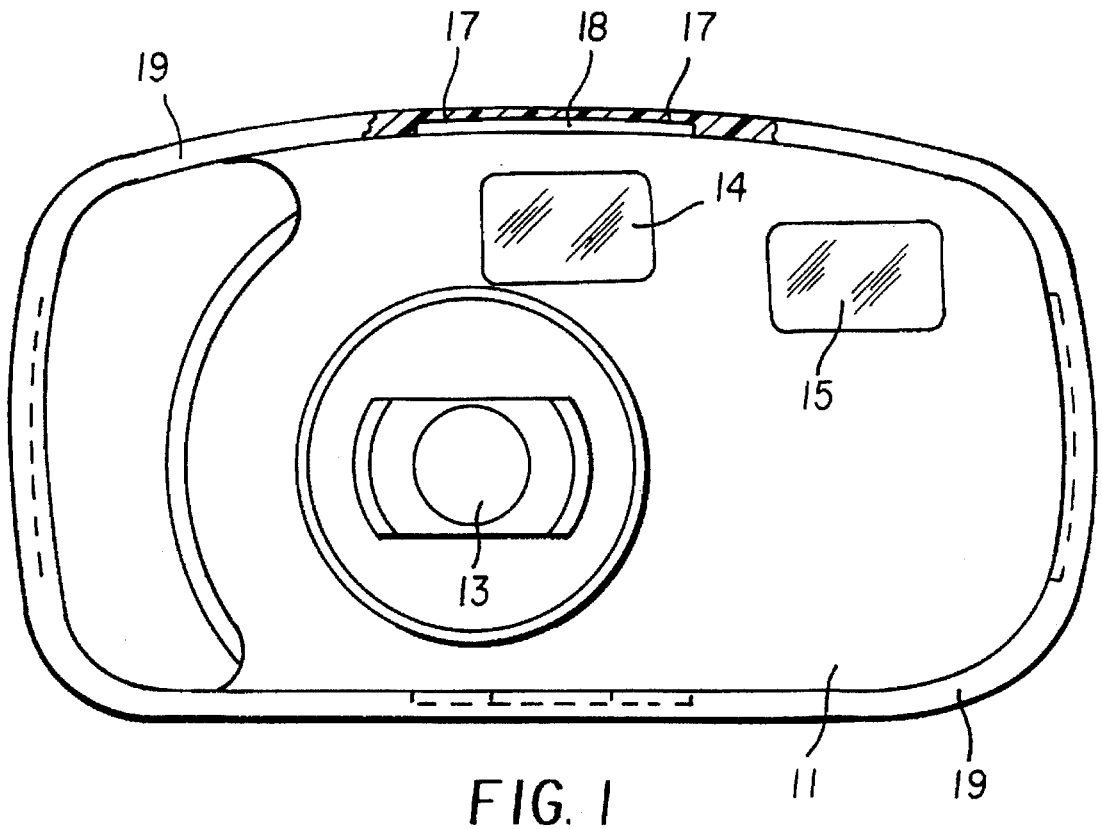
FIG. 1 shows the photographic camera in accordance with the invention in a front view, partly in section along the line I—I in FIG. 2.

The drawing shows a photographic camera as it is known as a so-called disposable camera. A camera of this type is loaded with a photographic film by the manufacturer and retailed in this state. After complete exposure of the film strip, the camera together with that film strip goes to a finisher for development of the film, where the latter is removed. The camera body is returned to the manufacturer, is overhauled for resale, and loaded with a new photographic film strip. These cameras have a very simple design so that they can be sold at low cost, but should however have certain function features permitting versatile use and convenient handling of the camera.

Figure 2:
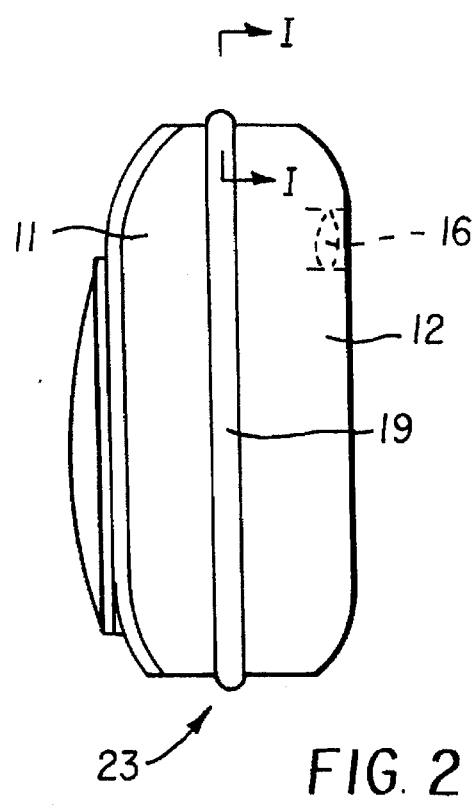
FIG. 2 shows the camera according to FIG. 1 in a side view.

The camera shown in FIGS. 1 and 2 comprises two body shells 11 and 12 of approximately equal size, with body shell 11 forming the front of the camera and body shell 12 its back. The body shell 11 forming the camera front accommodates an object lens 12, a lookthrough viewfinder 14 and a flash unit 15. The body shell 12 forming the back of the camera accommodates a film transport and film guidance unit and the eyepiece 16 for the lookthrough viewfinder 14. In the assembled state, the two body shells 11 and 12 provide one space for the film supply spool and one space for the film winding spool.

Figure 3:
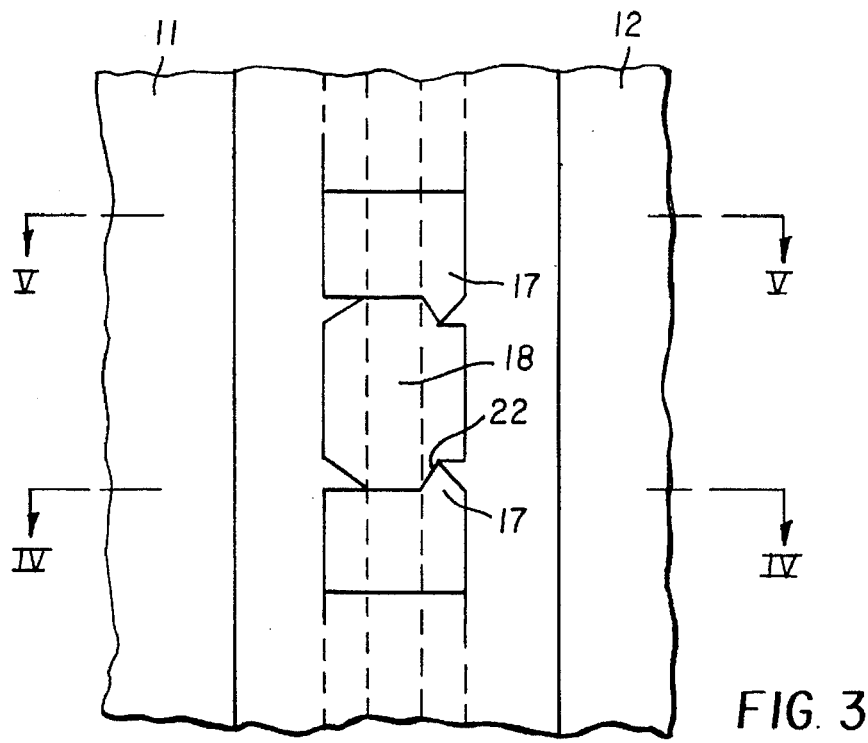
FIG. 3 shows the camera according to FIG. 1 with engaging means for the body shells in a plan view.

The two body shells 11 and 12 are firmly yet detachably connected by engaging means. The engaging means comprise engaging noses 17 and 18 integral with the body shells 11 and 12 which are of elastic design and which interlock in engaging manner when the body shells 11 and 12 are assembled, as shown in FIG. 3. To make the camera in accordance with the invention weatherproof and watertight, the parting line formed between the body shells 11 and 12 is sealed by means of an all-round endless weatherstrip 19.

The endless weatherstrip 19 and the engaging noses 17, 18 are so designed and dimensioned that the endless weatherstrip 19 completely covers the engaging noses 17 and 18. The endless weatherstrip 19 not only seals the parting line 23 between the body shells 11 and 12, but also emphasizes visually the sealing function, so that the camera can be recognized as a watertight camera also as a consequence of the visible endless weatherstrip 19.

Figure 4:
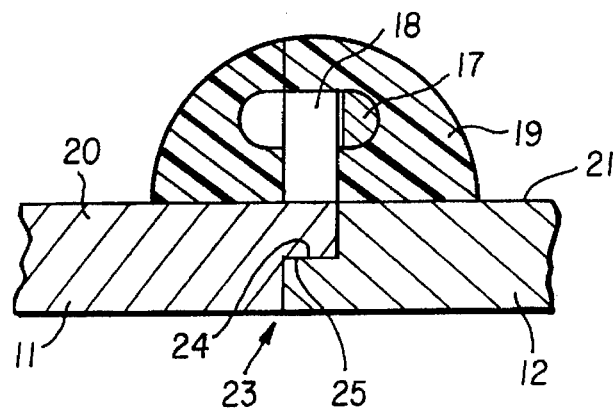
FIG. 4 shows the camera according to FIG. 1 in a section along the line IV—IV in FIG. 3.

FIG. 4 shows the design of the engaging means. The engaging nose 17 on the body shell 11 is of P-shaped design in its cross-section and rises above the surface 20 of the body shell 11. The engaging nose 18 on the body shell 12 is also P-shaped in cross-section and rises above the surface 21 of the body shell 12. The engaging nose 18 has on both sides a contact shoulder 22 with which the engaging nose 17 of the body shell 11 is in engaging contact.

The endless weatherstrip 19 completely covers the engaging noses 17 and 18 and seals the parting line 23 between the body shells 11 and 12 in watertight manner. The parting line 23 is formed by rebates 24 and 25 provided on body shells 11 and 12 respectively.

Figure 5:
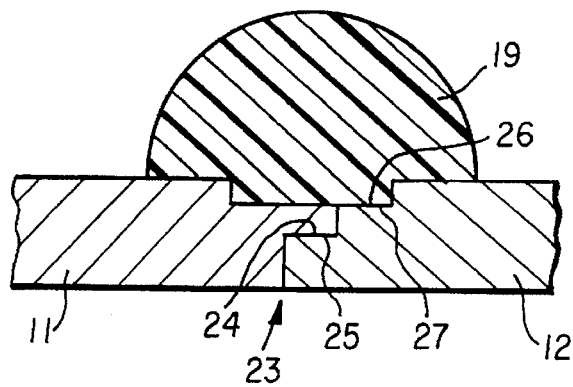
FIG. 5 shows the camera according to FIG. 1 in a section along the line V—V in FIG. 3.

FIG. 5 shows the design and arrangement of the endless weatherstrip 19 outside the engaging noses 17 and 18. The endless weatherstrip 19 is provided with a pedestal-like foot 26 that fits into a recess 27 provided in the body shells 11 and 12 and extending from their surfaces 20 and 21 respectively.

FIGS. 6 and 7 show a connection variant for the two body shells 11 and 12 in which the engaging noses 17 and 18 are dispensed with. Each body shell 11 and 12 has an all-round web 28 and 29 respectively, of P-shaped cross-section, the backs of said webs being in contact with one another. The endless weatherstrip 19 enclosing the webs 28 and 29 under prestress holds the body shells together and at the same time seals the parting line 23 in watertight manner.

In FIGS. 8 and 9, the webs of P-shaped cross-section are not all-round, but only provided individually and at intervals as webs 28 and 29. Apart from the webs 28 and 29, the design and arrangement are as shown in FIG. 9, corresponding to what was described in FIG. 5.

Figure 10:
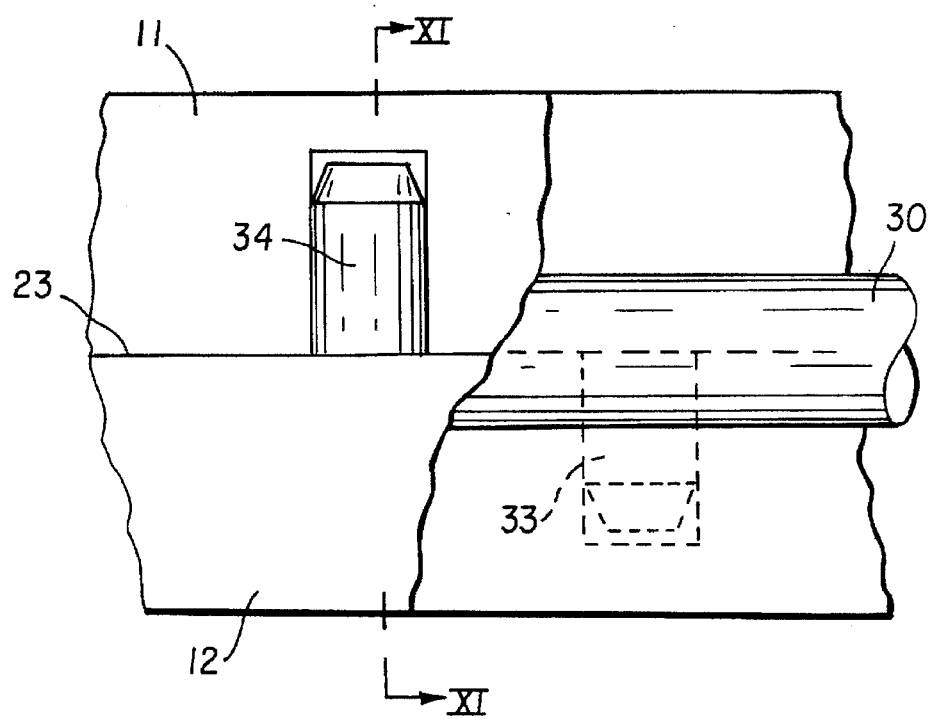
FIG. 10 shows a further embodiment of the camera in accordance with the invention in a plan view, partially in section.
Figure 11:
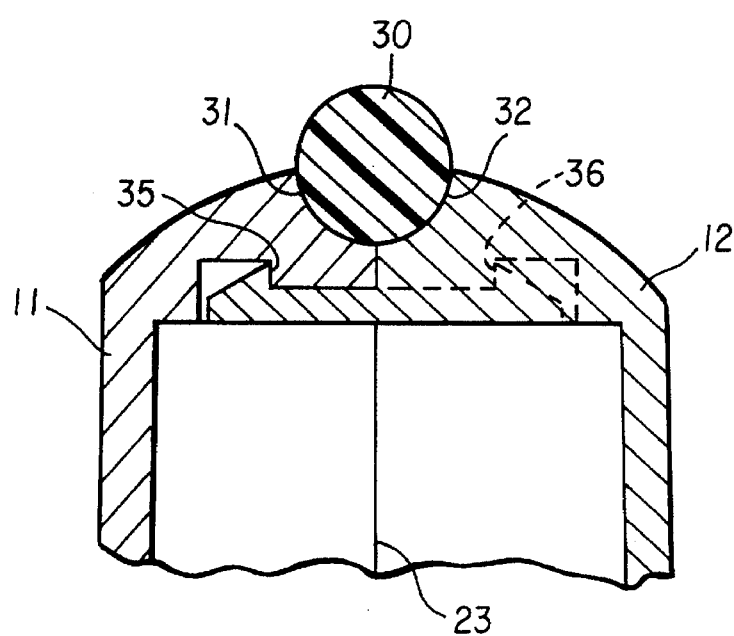
FIG. 11 shows the camera according to FIG. 10 in a section along the line XI—XI in FIG. 10.

In FIGS. 10 and 11, a further embodiment is described in which the endless weatherstrip 19 is a simple all-round O-ring 30 provided with a sealing effect and under prestress in quadrant-shaped recesses 31 and 32 in body shells 11 and 12 respectively. The body shells 11 and 12 are held together by integrally cast engaging hooks 33 and 34 alternately provided thereon, which also alternately mate with locking surfaces 35 and 36 integral with the body shells 11 and 12.

We claim:

1. A water-resistant camera housing comprising a pair of housing parts (11 & 12) which come together at an endless seam (23) between said pair of housing parts to form an enclosure, and an endless sealing strip (19) for preventing water from leaking into said enclosure through said endless seam, is characterized in that:

said endless sealing strip is arranged at least partially outside said pair of housing parts, completely over said endless seam, to be visible from outside the pair of housing parts in order to indicate the water-resistant nature of said camera housing; and respective means (26 & 27) on said pair of housing parts and said endless sealing strip secure the endless sealing strip to the pair of housing parts, to prevent the endless sealing strip from falling off the pair of housing parts.

2. A water-resistant camera housing as recited in claim 1, wherein respective engaging members (17 & 18) which engage to hold said pair of housing parts together are located at least partially outside the pair of housing parts, and said endless sealing strip completely covers said engaging members to conceal them.

3. A water-resistant camera housing as recited in claim 2, wherein said endless sealing strip is elastic to resiliently urge said engaging members together.

4. A water-resistant camera housing as recited in claim 1, wherein said pair of housing parts have respective exterior projections (28 & 29) which come together along said endless seam, and said endless sealing strip covers said projections and is elastic to resiliently urge said projections together to hold said pair of housing parts together.

* * * * *